(12) United States Patent
Hsieh et al.

(10) Patent No.: US 10,397,942 B2
(45) Date of Patent: Aug. 27, 2019

(54) METHOD OF HANDLING COMMUNICATION OPERATION IN TDD SYSTEM AND RELATED APPARATUS

(71) Applicant: Industrial Technology Research Institute, Hsinchu (TW)

(72) Inventors: Chia-Wen Hsieh, New Taipei (TW); Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 378 days.

(21) Appl. No.: 13/962,923

(22) Filed: Aug. 8, 2013

(65) Prior Publication Data

US 2014/0044066 A1   Feb. 13, 2014

Related U.S. Application Data

(60) Provisional application No. 61/681,644, filed on Aug. 10, 2012.

(51) Int. Cl.
*H04L 5/00* (2006.01)
*H04W 72/12* (2009.01)
(Continued)

(52) U.S. Cl.
CPC ....... *H04W 72/1278* (2013.01); *H04L 1/1812* (2013.01); *H04L 5/0055* (2013.01); *H04L 5/14* (2013.01)

(58) Field of Classification Search
CPC .......................... H04W 72/12; H04W 72/1278; H04W 72/04; H04W 72/0413; H04W 72/0446;
(Continued)

(56) References Cited

U.S. PATENT DOCUMENTS 9,479,965 B2 * 10/2016 Seo .................. H04L 27/2602
2011/0176461 A1 * 7/2011 Astely ................. H04B 7/2656
370/280
(Continued)

FOREIGN PATENT DOCUMENTS

CN         101965707 A     2/2011
CN         102076031 A     5/2011
(Continued)

OTHER PUBLICATIONS

Ericsson et al., Remaining issues in general frame work for aggregation of carriers with different UL/DL configurations, 3GPP TSG-RAN WG1 #68, Feb. 6-10, 2012, R1-120070, XP055291433, Dresden, Germany.
(Continued)

*Primary Examiner* — Un C Cho
*Assistant Examiner* — Rasha K Fayed
(74) *Attorney, Agent, or Firm* — Winston Hsu

(57) ABSTRACT

A method of handling a communication operation for a network of a wireless communication system comprises determining a reconfiguration set comprising at least one UL/DL configuration; scheduling a UL/DL configuration in the reconfiguration set for a frame; determining a reference UL/DL configuration according to the reconfiguration set; transmitting information related to the reconfiguration set to a communication device of the wireless communication system; and performing a communication operation in the frame with the communication device according to the reference UL/DL configuration, irrespective of the UL/DL configuration scheduled for the frame, wherein the communication operation is a transmission, or the communication operation is a reception.

40 Claims, 14 Drawing Sheets

(51) Int. Cl.
*H04L 5/14* (2006.01)
*H04L 1/18* (2006.01)

(58) Field of Classification Search
CPC .................. H04W 72/1289; H04W 28/04; H04W 28/06; H04W 4/00; H04W 52/367; H04W 52/60; H04W 52/146; H04W 52/34; H04L 5/0055; H04L 5/143; H04L 5/0053; H04L 5/001; H04L 5/0007; H04L 5/0023; H04L 5/00; H04L 5/14; H04L 1/18; H04L 1/1861; H04L 1/1822; H04L 1/1812; H04B 7/2656
USPC .................................................. 370/329, 280
See application file for complete search history.

(56) References Cited

U.S. PATENT DOCUMENTS

| | | | | |
|---|---|---|---|---|
| 2011/0211503 | A1* | 9/2011 | Che | H04L 5/0005 370/280 |
| 2011/0274015 | A1* | 11/2011 | Astely | H04B 7/2656 370/280 |
| 2013/0188516 | A1* | 7/2013 | He | H04W 28/16 370/254 |
| 2013/0194980 | A1* | 8/2013 | Yin | H04L 1/1607 370/280 |
| 2013/0223295 | A1* | 8/2013 | Choi | H04L 1/18 370/280 |
| 2013/0242816 | A1* | 9/2013 | He | H04W 72/0413 370/280 |
| 2013/0242823 | A1* | 9/2013 | Lin | H04B 7/2656 370/280 |
| 2013/0272169 | A1* | 10/2013 | Wang | H04W 72/0446 370/280 |
| 2013/0279459 | A1* | 10/2013 | Lee | H04L 1/0029 370/329 |
| 2013/0336160 | A1* | 12/2013 | Yin | H04L 1/1854 370/254 |
| 2015/0172030 | A1* | 6/2015 | Tiirola | H04L 1/1854 370/280 |
| 2016/0021655 | A1* | 1/2016 | Seo | H04L 1/1829 370/280 |
| 2017/0303239 | A1* | 10/2017 | Sagfors | H04W 72/02 |

FOREIGN PATENT DOCUMENTS

| | | |
|---|---|---|
| CN | 102204154 A | 9/2011 |
| EP | 2 658 303 A1 | 10/2013 |
| TW | 201228420 | 7/2012 |
| WO | 2012083811 A1 | 6/2012 |

OTHER PUBLICATIONS

Alcatel-Lucent Shanghai Bell et al., Discussion on HARQ and UL-grant timing with dynamic TDD UL-DL configuration, 3GPP TSG RAN WG1 Meeting #68bis, Jeju, Korea, Mar. 26-30, 2012, R1-121260, pp. 1-6, XP050599549.

Huawei et al., Methods to support different time scales for TDD UL-DL reconfiguration, 3GPP TSG RAN WG1 Meeting #69, Prague, Czech Republic, May 21-25, 2012, R1-122909, XP050601178.

\* cited by examiner

| UL/DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 1 PRIOR ART

METHOD OF HANDLING
> COMMUNICATION OPERATION IN TDD
> SYSTEM AND RELATED APPARATUS

CROSS REFERENCE TO RELATED APPLICATIONS

This application claims the benefit of U.S. Provisional Application No. 61/681,644, filed on Aug. 10, 2012, entitled "Method and Apparatus to Handle Time-Domain Duplex (TDD) Reconfiguration", the contents of which are incorporated herein in their entirety.

BACKGROUND OF THE INVENTION

1. Field of the Invention

The application relates to a method utilized in a wireless communication system, and more particularly, to a method of handling a communication operation in a time-division duplexing (TDD) system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system operating in a frequency-division duplexing (FDD) mode (or simply FDD system), directions of subframes of a frequency band in the LTE/LTE-A system operating in a time-division duplexing (TDD) mode (or simply TDD system) may be different. That is, the subframes in the same frequency band are divided into UL subframes, downlink (DL) subframes and special subframes according to the UL/DL configuration specified in the 3GPP standard.

Please refer to FIG. 1 which is a table 10 of the UL/DL configuration with subframes and corresponding directions. In FIG. 1, 7 UL/DL configurations are shown, wherein each of the UL/DL configurations indicates a set of directions for 10 subframes, respectively. In detail, "U" means that the subframe is a UL subframe where UL data is transmitted, and "D" means that the subframe is a DL subframe where DL data is transmitted. "S" means that the subframe is a special subframe where control information and maybe data (according to the special subframe configuration) is transmitted, and the special subframe can also be seen as the DL subframe in the present invention.

Furthermore, a UL/DL configuration of a legacy UE can be changed (i.e., reconfigured) according to system information (e.g., System Information Block Type 1 (SIB1)) transmitted by an eNB, e.g., from the UL/DL configuration 1 to the UL/DL configuration 3. A minimum periodicity of transmitting the SIB1 is usually large (e.g., 640 ms), and the legacy UE can only change the UL/DL configuration with the periodicity equal or greater than 640 ms. The semi-statics allocation cannot match fast varying traffic characteristics and environments, and there is space for improving system performance. Thus, changing the UL/DL configuration with a lower periodicity (e.g., lower than 640 ms) is considered.

However, when an advanced UE intends to change the UL/DL configuration fast (e.g., according to the traffic characteristics) or suffers from a fast change of the UL/DL configuration, the advanced UE may fail in the following situations. For example, the UE may miss a notification (e.g., DL control information (DCI)) for changing the UL/DL configuration. That is, the UE does not know the change of the UL/DL configuration. In another example, the UE may change the UL/DL configuration erroneously due to a false alarm. That is, the UE determines that the UL/DL configuration changes, while the UL/DL configuration does not. In another example, the UE may fail to transmit or receive a hybrid automatic repeat request (HARQ) feedback due to the change of the UL/DL configuration, i.e., HARQ discontinuity.

In addition, a DL HARQ process starts to operate, when the advanced UE cannot decode a received packet successfully. The advanced UE stores soft values of transmitted/retransmitted (by the eNB) packets in a soft buffer of the advanced UE, and combines the soft values to increase a probability of successful decoding, as known by those skilled in the art. The advanced UE continues the DL HARQ process until the packet is decoded correctly, or until a maximum number of retransmissions have been sent, at which time the DL HARQ process declares a failure and leaves it up to the DL HARQ process in radio link control (RLC) for trying again. However, the advanced UE should partition and use the soft buffer according to the UL/DL configuration of the advanced UE. In other words, the advanced UE may repartition the soft buffer, when the UL/DL configuration changes. Thus, frequent repartitioning of the soft buffer may happen, if the UL/DL configuration changes frequently. In this situation, the soft values may not be stored in the soft buffer correctly, e.g., the soft values may be overwritten, may not be stored due to insufficient number of partitions, etc.

Therefore, a method for solving the abovementioned problems is needed.

SUMMARY OF THE INVENTION

The present invention therefore provides a method for handling a communication operation in a time-division duplexing (TDD) system, to solve the abovementioned problems.

A method of handling a communication operation for a network of a wireless communication system comprises determining a reconfiguration set comprising at least one UL/DL configuration; scheduling a UL/DL configuration in the reconfiguration set for a frame; determining a reference UL/DL configuration according to the reconfiguration set; transmitting information related to the reconfiguration set to a communication device of the wireless communication system; and performing a communication operation in the frame with the communication device according to the reference UL/DL configuration, irrespective of the UL/DL configuration scheduled for the frame, wherein the communication operation is a transmission, or the communication operation is a reception.

A method of handling a communication operation for a communication device of a wireless communication system comprises receiving first information transmitted by a network of the wireless communication system, for scheduling a UL/DL configuration in a reconfiguration set for a frame, wherein the reconfiguration set comprises at least one UL/DL configuration; obtaining second information related to the reconfiguration set; determining a reference UL/DL configuration according to the second information; and performing a communication operation in the frame with the network according to the reference UL/DL configuration, irrespective of the UL/DL configuration scheduled for the frame, wherein the communication operation is a transmission or a reception.

A method of handling a soft buffer of a communication device, the method being utilized in a network, comprises determining a reconfiguration set comprising at least one uplink (UL)/downlink (DL) configuration; and transmitting first information of a subset of the reconfiguration set to the communication device.

A method of handling a soft buffer of a communication device of a wireless communication system, the method being utilized in the communication device and comprises receiving first information of at least one uplink (UL)/downlink (DL) configuration, transmitted by a network of the wireless communication system; obtaining second information of at least one probability respectively corresponding to the at least one UL/DL configuration; and partitioning the soft buffer according to the at least one UL/DL configuration and the at least one probability.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of the UL/DL configuration with transmission directions of subframes.

DETAILED DESCRIPTION

Figure 2:
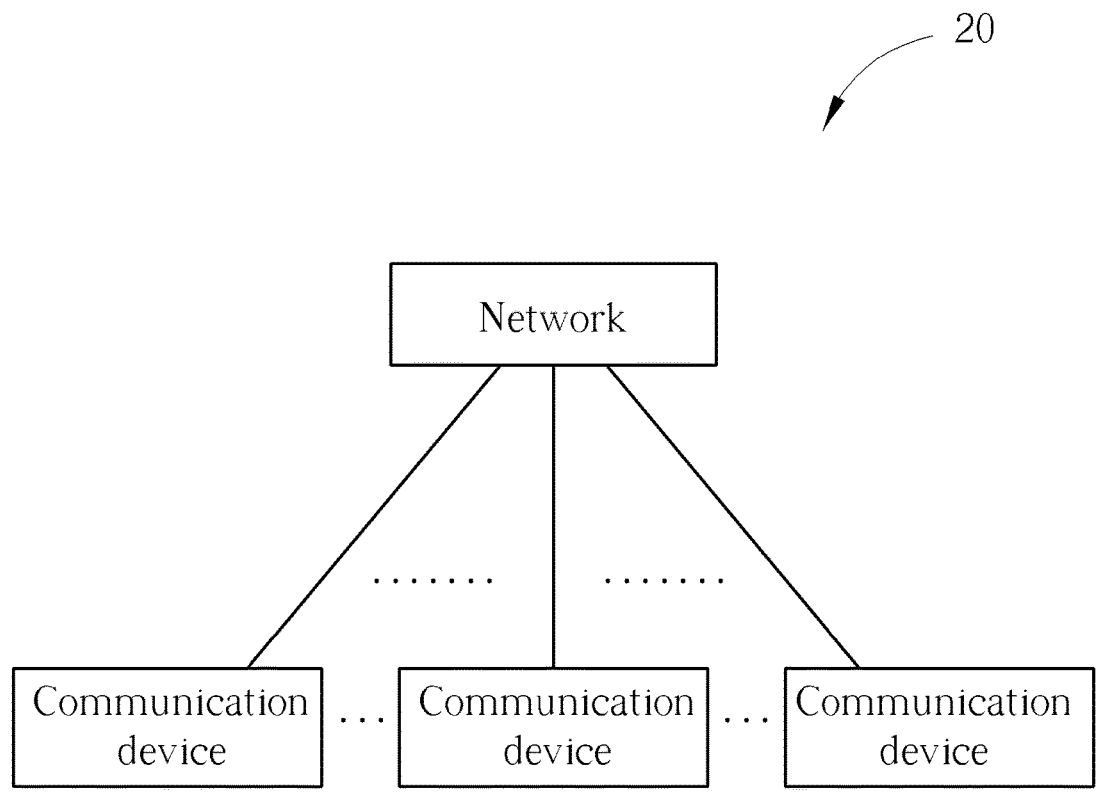
FIG. 2 is a schematic diagram of a wireless communication system according to an example of the present invention.

Please refer to FIG. 2, which is a schematic diagram of a wireless communication system 20 according to an example of the present invention. The wireless communication system 20 is briefly composed of a network and a plurality of communication devices. The wireless communication system 20 supports a time-division duplexing (TDD) mode. That is, the network and the communication devices can communicate with each other by using uplink (UL) subframes and downlink (DL) subframes according to one or more UL/DL configurations. Preferably, the communication device is an advanced user equipment (UE) or an advanced communication device capable of changing its uplink (UL)/downlink (DL) configuration with a low periodicity, e.g., lower than 640 ms, such as 200 ms, 100 ms, 10 ms. That is, the advanced UE can change its UL/DL configuration fast according to fast varying traffic characteristics and environments. For example, the advanced UE may refer to a communication device supporting the 3rd Generation Partnership Project (3GPP) Rel-11 standard or later versions. However, this is not a restriction. A legacy UE (or a legacy communication device) supporting the 3GPP standard or former versions may also have functions similar to those supported by the advanced UE via an update, and is not limited herein. In another example, the advanced UE may refer to a communication device support an enhanced interference mitigation and traffic adaption (EIMTA) function. In this situation, the legacy may refer to a communication device which does not enable (e.g., support) the EIMTA function.

In FIG. 2, the network and the communication devices are simply utilized for illustrating the structure of the wireless communication system 20. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system or a LTE-Advanced (LTE-A) system.

In addition, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network. A communication device can be a mobile phone, a laptop, a tablet computer, an electronic book or a portable computer system. Besides, the network and the communication device can be seen as a transmitter or a receiver according to transmission direction, e.g., for a UL, the communication device is the transmitter and the network is the receiver, and for a DL, the network is the transmitter and the communication device is the receiver. More specifically, for the network, the direction of the transmission is DL, and the direction of the reception is UL. For the UE, the direction of the transmission is UL, and the direction of the reception is DL.

Figure 3:
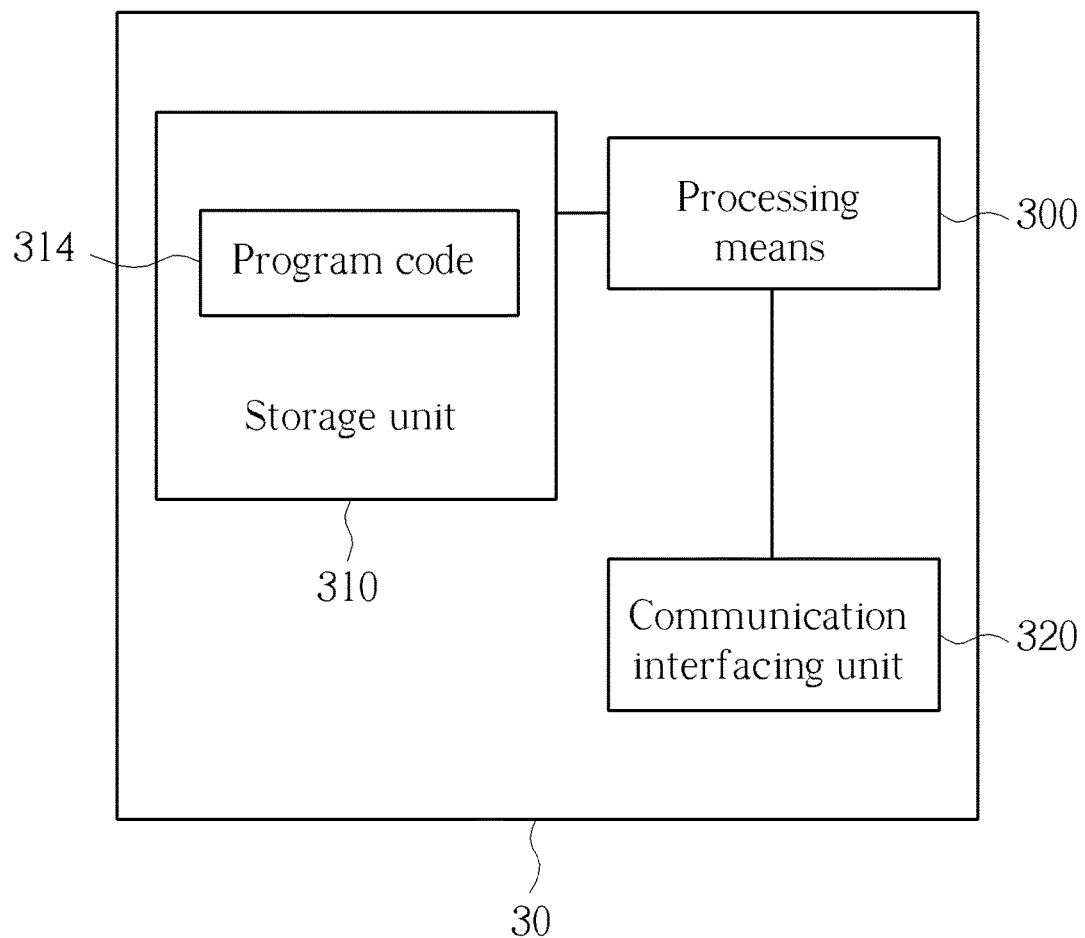
FIG. 3 is a schematic diagram of a communication device according to an example of the present invention.

Please refer to FIG. 3, which is a schematic diagram of a communication device 30 according to an example of the present invention. The communication device 30 can be used for realizing the communication device or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

When the wireless communication system 20 operates in the TDD mode, several UL/DL configurations, e.g., UL/DL configurations 0-6 in FIG. 1, can be supported. However, the communication device may miss a notification (e.g., DL control information (DCI)) for changing the UL/DL configuration, or the communication device may change the UL/DL configuration erroneously due to a false alarm (e.g., false detection). The above situations may happen, when the communication device needs to change (e.g., reconfigure) the UL/DL configuration fast. As a result, that the communication device may suffer performance loss, when the reconfiguration happens.

Figure 4:
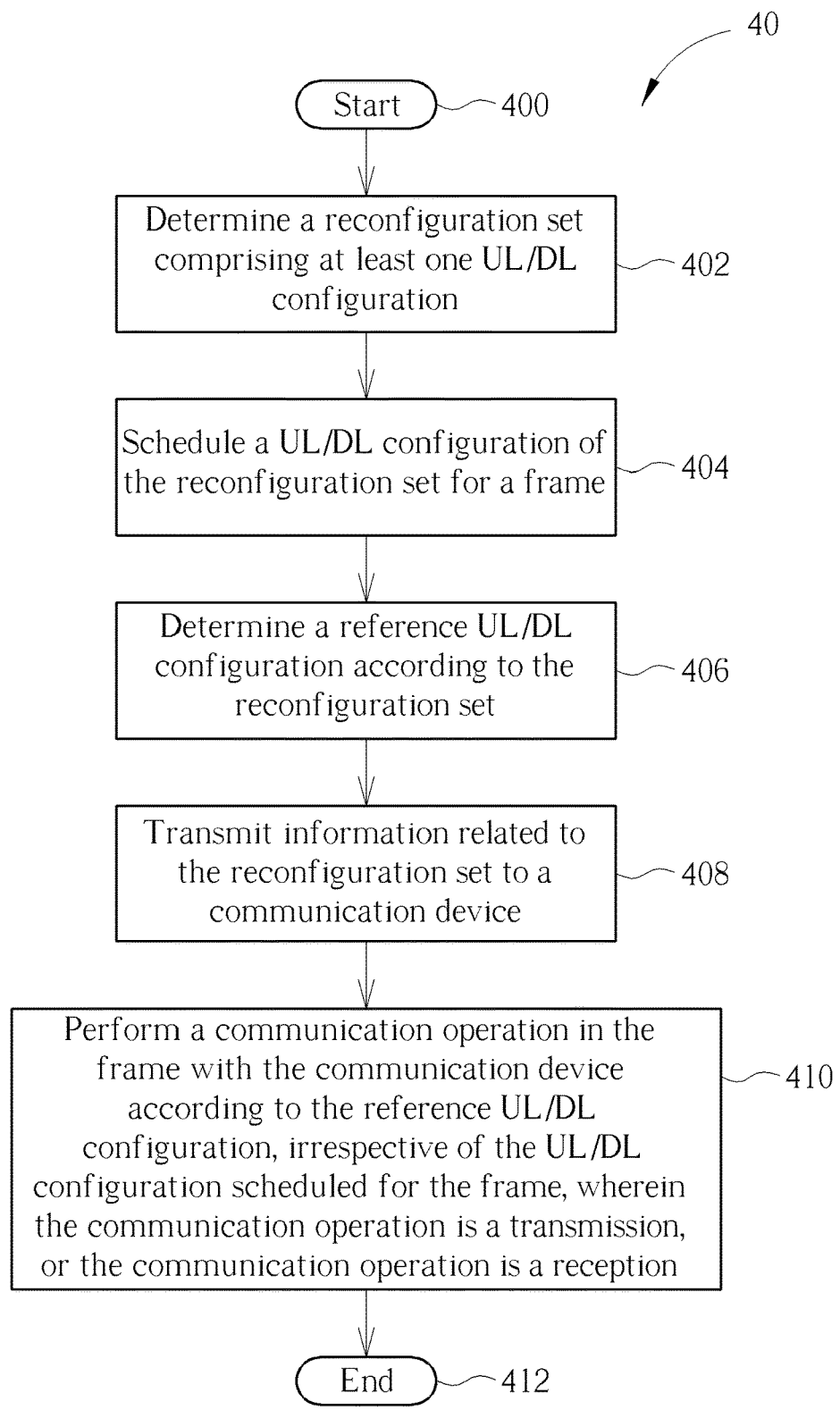
FIG. 4 is a flowchart of a process according to an example of the present invention.

Please refer to FIG. 4, which is a flowchart of a process 40 according to an example of the present invention. The process 40 is utilized the network shown in FIG. 2, for handling a communication operation in the network, to solve the abovementioned problems. The process 40 may be compiled into the program code 314 and includes the following steps:

Step 400: Start.

Step 402: Determine a reconfiguration set comprising at least one UL/DL configuration.

Step 404: Schedule a UL/DL configuration of the reconfiguration set for a frame.

Step 406: Determine a reference UL/DL configuration according to the reconfiguration set.

Step 408: Transmit information related to the reconfiguration set to a communication device.

Step 410: Perform a communication operation in the frame with the communication device according to the reference UL/DL configuration, irrespective of the UL/DL configuration scheduled for the frame, wherein the communication operation is a transmission, or the communication operation is a reception.

Step 412: End.

According to the process 40, the network determines a reconfiguration set comprising at least one UL/DL configuration, to communicate with a communication device by using any UL/DL configuration in the reconfiguration set. The network may schedule a UL/DL configuration of the reconfiguration set for a frame. In addition, the network determines a reference UL/DL configuration according to the reconfiguration set, and transmits information related to the reconfiguration set to the communication device. Then, the network performs a communication operation with the communication device according to the reference UL/DL configuration, irrespective of the UL/DL configuration scheduled for the frame, wherein the communication operation is a transmission, or the communication operation is a reception. In other words, the network communicates with (e.g., transmits a packet to, or receives a packet from) the communication device according to the reference UL/DL configuration in the frame, no matter which UL/DL configuration is scheduled for (or configured to) the frame. Thus, even if the communication device misses a notification (e.g., DCI) for scheduling (e.g., configuring, changing, etc.) the UL/DL configuration or changes the UL/DL configuration erroneously due to a false alarm, the communication between the network and the communication device is not affected since the reference UL/DL configuration is used. As a result, performance (e.g., throughput) of the communication device is improved.

Realization of the process 40 is not limited to the above description. For example, the information may include the reference UL/DL configuration, and the communication device can perform the communication operation according to the reference UL/DL configuration directly. In another example, the information may include the reconfiguration set. The communication device needs to determine the reference UL/DL configuration according to the reconfiguration set first, and then performs the communication operation according to the reference UL/DL configuration.

In addition, a time period during which the process 40 is realized is not limited. For example, the network may perform the communication operation with the communication device according to the reference UL/DL configuration, irrespective of the UL/DL configuration of the frame, within at least one frame after the frame. That is, the reference UL/DL configuration is used during first few frames following the frame. In another example, the network may perform the communication operation with the communication device according to the reference UL/DL configuration, irrespective of the UL/DL configuration of the frame, after the reconfiguration set is determined. That is, the reference UL/DL configuration is determined and used for all frames, after the reconfiguration set is determined. Note that the frame mentioned above can be any specific frame. For example, the frame may be a frame at which (or before which) a change of the UL/DL configuration occurs.

On the other hand, the step of performing the communication operation in the frame with the communication device according to the reference UL/DL configuration, irrespective of the UL/DL configuration scheduled for the frame may include receiving a DL hybrid automatic repeat request (HARQ) feedback corresponding to (i.e., in response to) at least one physical DL shared channel (PDSCH) transmission, in a non-conflicting UL subframe of the frame, according to the reference UL/DL configuration, wherein the DL HARQ feedback is transmitted by the communication device. No that the non-conflicting UL subframe means that it is UL for all the at least one UL/DL configuration in the reconfiguration set. In this situation, the network may determine the reference UL/DL configuration such that each DL subframe of each of the at least one UL/DL configuration corresponds to a DL subframe of the reference UL/DL configuration. For example, the DL subframes of the reference UL/DL configuration may be a superset of the DL subframes of each of the at least one UL/DL configuration.

Figure 5:
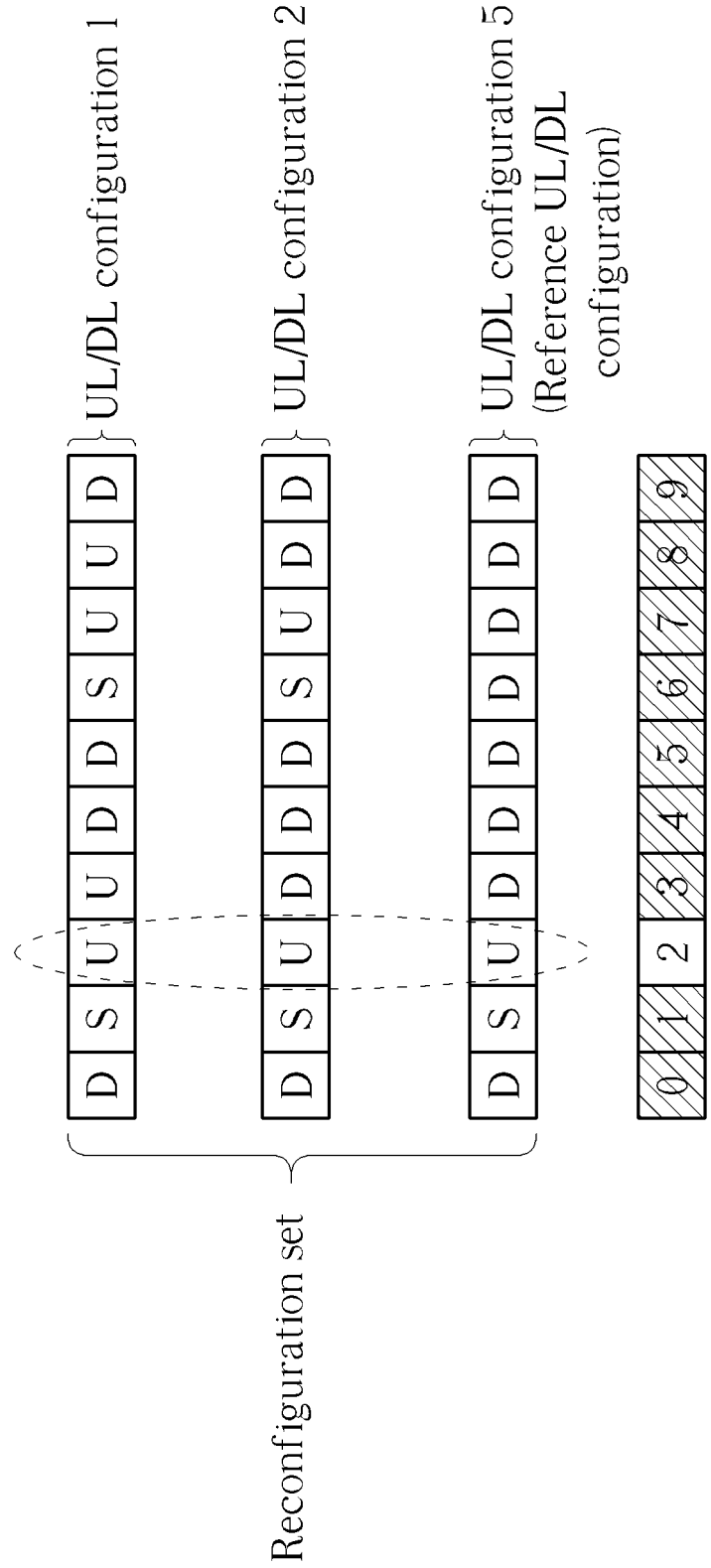
FIG. 5 is a schematic diagram of a reconfiguration set according to an example of the present invention.

Please refer to FIG. 5, which is a schematic diagram of a reconfiguration set according to an example of the present invention. As shown in FIG. 5, the reconfiguration set includes UL/DL configurations 1, 2 and 5. UL subframes and DL subframes are indicated by respective subframe indices. According to the above description, the network determines that the reference UL/DL configuration is the UL/DL configuration 5, because each DL subframe of each of the UL/DL configurations 1, 2 and 5 with a same subframe index corresponds to a DL subframe of the UL/DL configuration 5. In addition, the network can receive a DL HARQ feedback corresponding to at least one PDSCH transmission, in a non-conflicting UL subframe of the frame, according to the UL/DL configuration 5. For example, the at least one PDSCH transmission means that the network transmits data to the communication device via the PDSCH. Note that the subframe 2 is the only non-conflicting UL subframe according to the UL/DL configuration 5.

Figure 6:
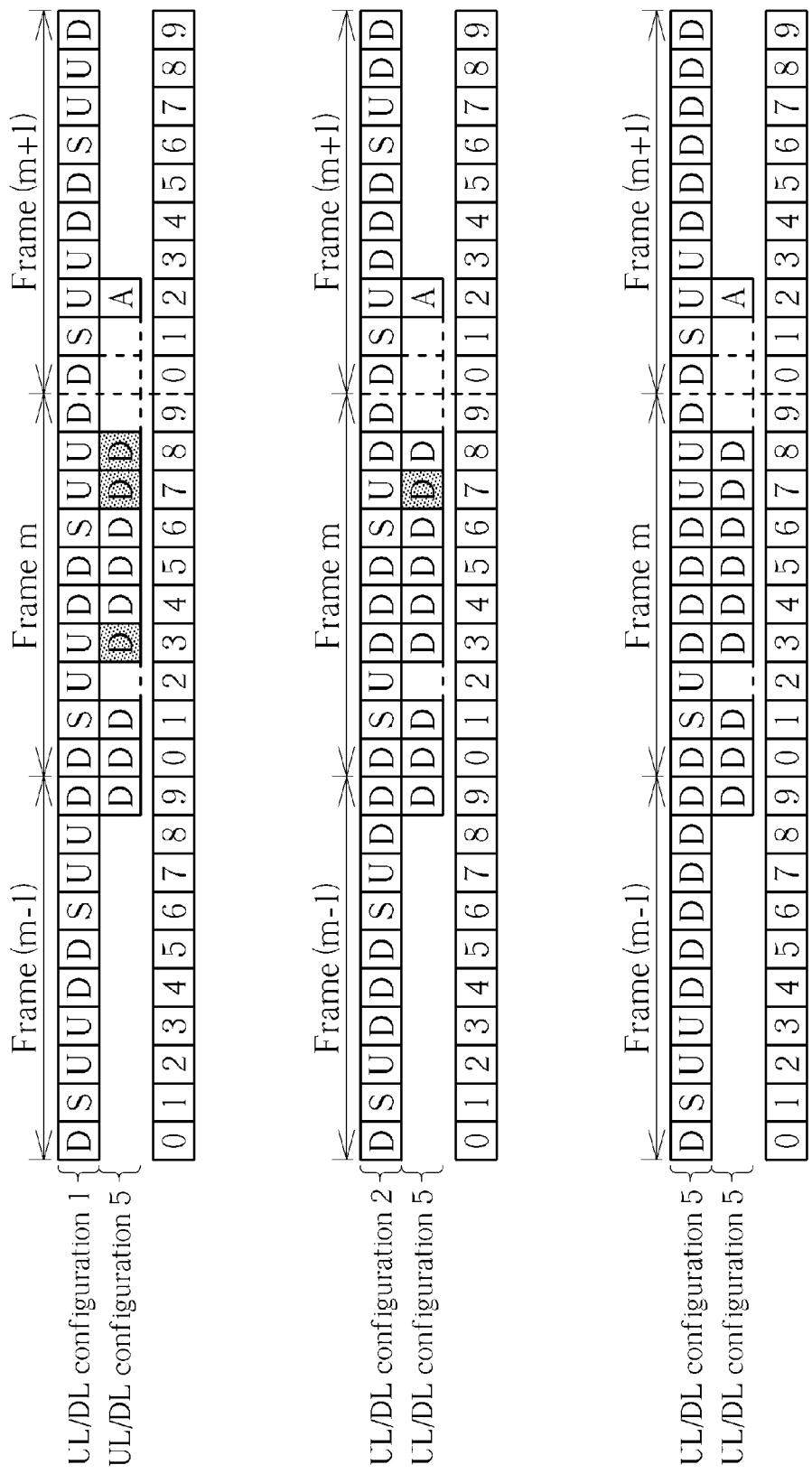
FIG. 6 is a schematic diagram of timelines of DL HARQ feedbacks of UL/DL configurations according to an example of the present invention.

Please refer to FIG. 6, which is a schematic diagram of timelines of DL HARQ feedbacks of UL/DL configurations according to an example of the present invention. As shown in FIG. 6, whether the UL/DL configuration 1, 2 or 5 is scheduled for (or configured to) frames (m−1) m and (m+1), the network receives (or intends to receive) the DL HARQ feedback in the subframe 2 of the frame (m+1) according to the reference UL/DL configuration which is the UL/DL configuration 5. That is, the timeline of the UL/DL configuration 5 for receiving the DL HARQ feedback is used for the other UL/DL configurations in the same reconfiguration set. For example, if the UL/DL configuration 2 is scheduled for the frames (m−1), m and (m+1), the network may receive a DL HARQ feedback in the subframe 2 of the frame (m+1) transmitted by the communication device, wherein the DL HARQ feedback corresponds to the PDSCH transmission(s) in the subframe 9 of the frame (m−1) and/or the subframes 0, 1, 3, 4, 5, 6 and/or 8 of the frame m. Since the subframes 3, 7 and 8 are the UL subframes for the UL/DL configuration 1 and the subframe 7 is the UL subframe for the UL/DL configuration 2, no PDSCH transmission happens in these subframes and no DL HARQ feedback is expected to be received for these subframes.

On the other hand, the step of performing the communication operation in the frame with the communication device according to the reference UL/DL configuration, irrespective of the UL/DL configuration scheduled for the frame may include transmitting a UL grant in a first non-conflicting DL subframe of the frame to the communication device according to the reference UL/DL configuration, or may include transmitting a UL HARQ feedback corresponding to (i.e., in response to) at least one physical UL shared channel (PUSCH) reception, in a second non-conflicting DL subframe of the frame, to the communication device according to the reference UL/DL configuration. For example, the at least one PUSCH transmission means that the communication device transmits data to the network via the PUSCH. Note that the non-conflicting DL subframe means that it is DL for all the at least one UL/DL configuration in the reconfiguration set. In this situation, the network may determine the reference UL/DL configuration such that each UL subframe of each of the at least one UL/DL configuration with a same subframe index corresponds to a UL subframe of the reference UL/DL configuration. For example, the UL subframes of the reference UL/DL configuration may be a superset of the UL subframes of each of the at least one UL/DL configuration.

Figure 7:
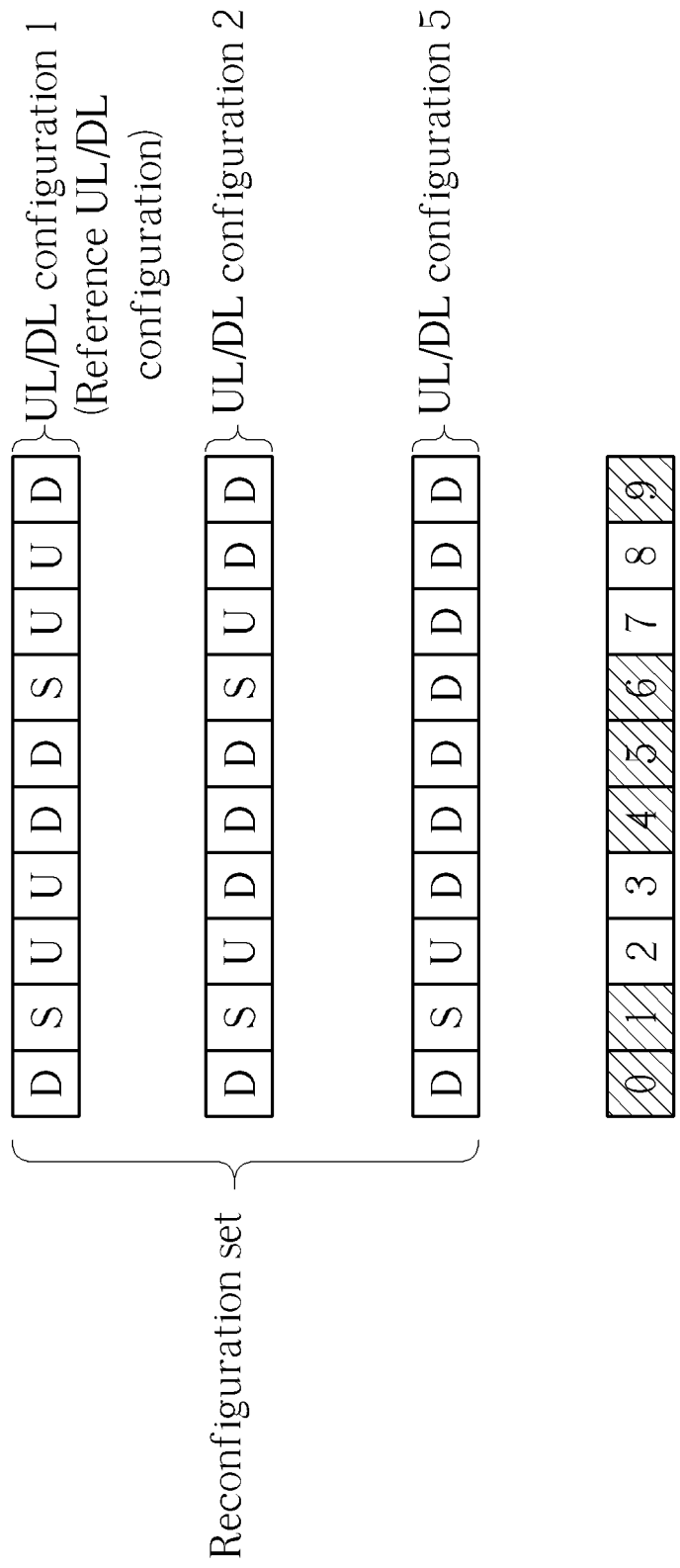
FIG. 7 is a schematic diagram of a reconfiguration set according to an example of the present invention.

Please refer to FIG. 7, which is a schematic diagram of a reconfiguration set according to an example of the present invention. As shown in FIG. 7, the reconfiguration set includes UL/DL configurations 1, 2 and 5. UL subframes and DL subframes are indicated by respective subframe indices. According to the above description, the network determines that the reference UL/DL configuration is the UL/DL configuration 1, because each UL subframe of the UL/DL configurations 1, 2 and 5 with a same subframe index corresponds to a UL subframe of the UL/DL configurations 1. In addition, the network can transmit a UL grant in a non-conflicting DL subframe of the frame to the communication device according to the UL/DL configuration 1. Note that the non-conflicting DL subframes are subframes 0, 1, 4, 5, 6 and 9.

Figure 8:
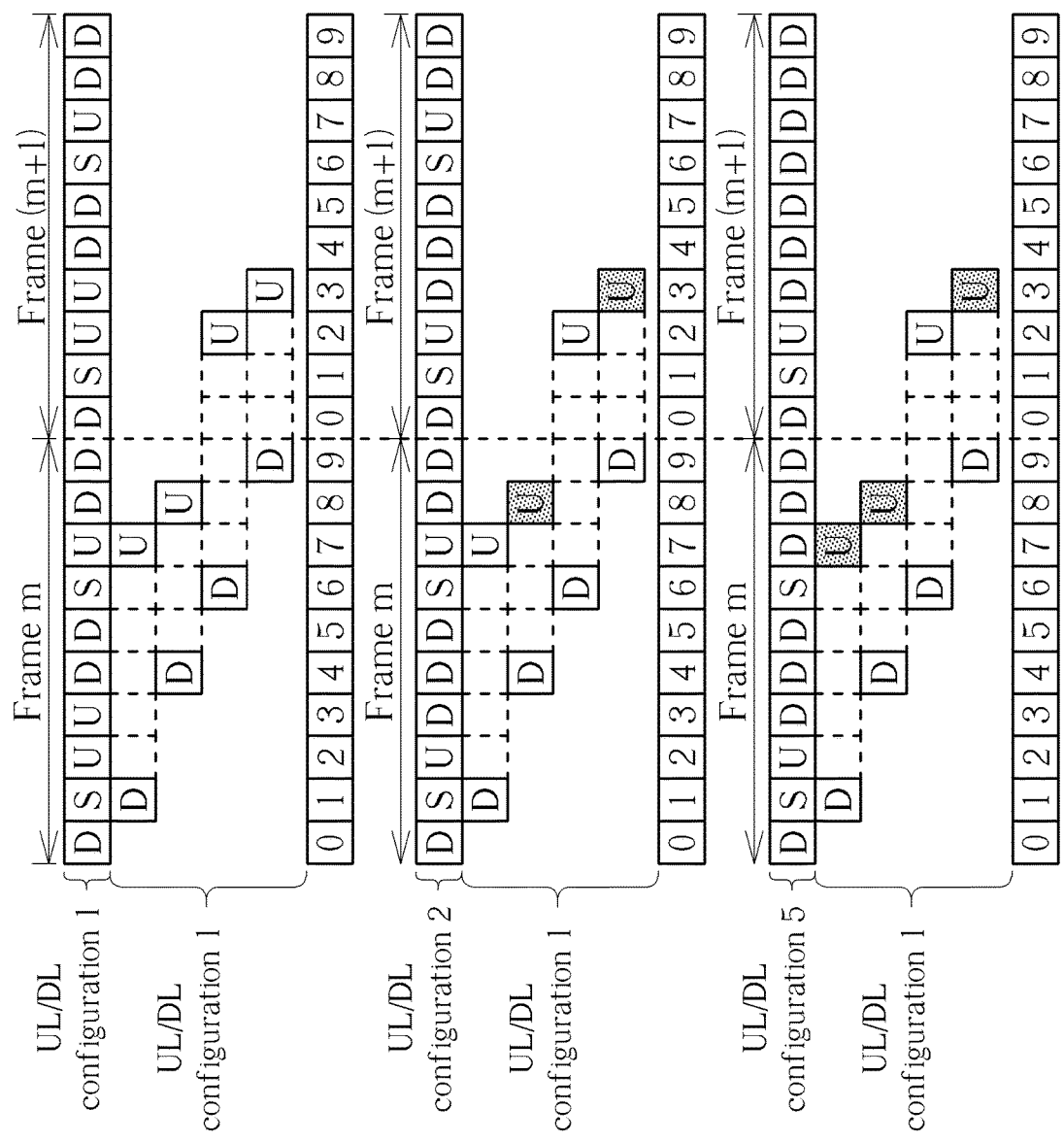
FIG. 8 is a schematic diagram of timelines of UL grant schedulings of UL/DL configurations according to an example of the present invention.

Please refer to FIG. 8, which is a schematic diagram of timelines of UL grant schedulings of UL/DL configurations according to an example of the present invention. As shown in FIG. 8, whether the UL/DL configuration 1, 2 or 5 is scheduled for (or configured to) frames m and (m+1), the network transmits (or intends to transmit) the UL grant in a non-conflicting DL subframe of the frame m according to the reference UL/DL configuration which is the UL/DL configuration 1. That is, the timeline of the UL/DL configuration 1 for scheduling the PUSCH corresponding to the UL grant is used for the other UL/DL configurations in the same reconfiguration set. For example, if the UL/DL configuration 2 is scheduled for the frames m and (m+1), the network may transmit a UL grant in the subframe 1 of the frame m to the communication device, wherein the UL grant is used for scheduling a PUSCH transmission in the subframe 7 of the frame m. Since the subframes 3 and 8 are the DL subframes for the UL/DL configuration 2, no UL grant should be transmitted for allocating these subframes to the communication device when the UL/DL configuration 2 is scheduled for (or configured to) the frames m and (m+1). Similarly, since the subframes 3, 7 and 8 are the DL subframes for the UL/DL configuration 5, no UL grant should be transmitted for allocating these subframes to the communication device when the UL/DL configuration 5 is scheduled for (or configured to) the frames m and (m+1).

In another example, the network can transmit a UL HARQ feedback corresponding to at least one PUSCH reception, in a non-conflicting DL subframe of the frame, to the communication device according to the reference UL/DL configuration (e.g., the UL/DL configuration 1).

Figure 9:
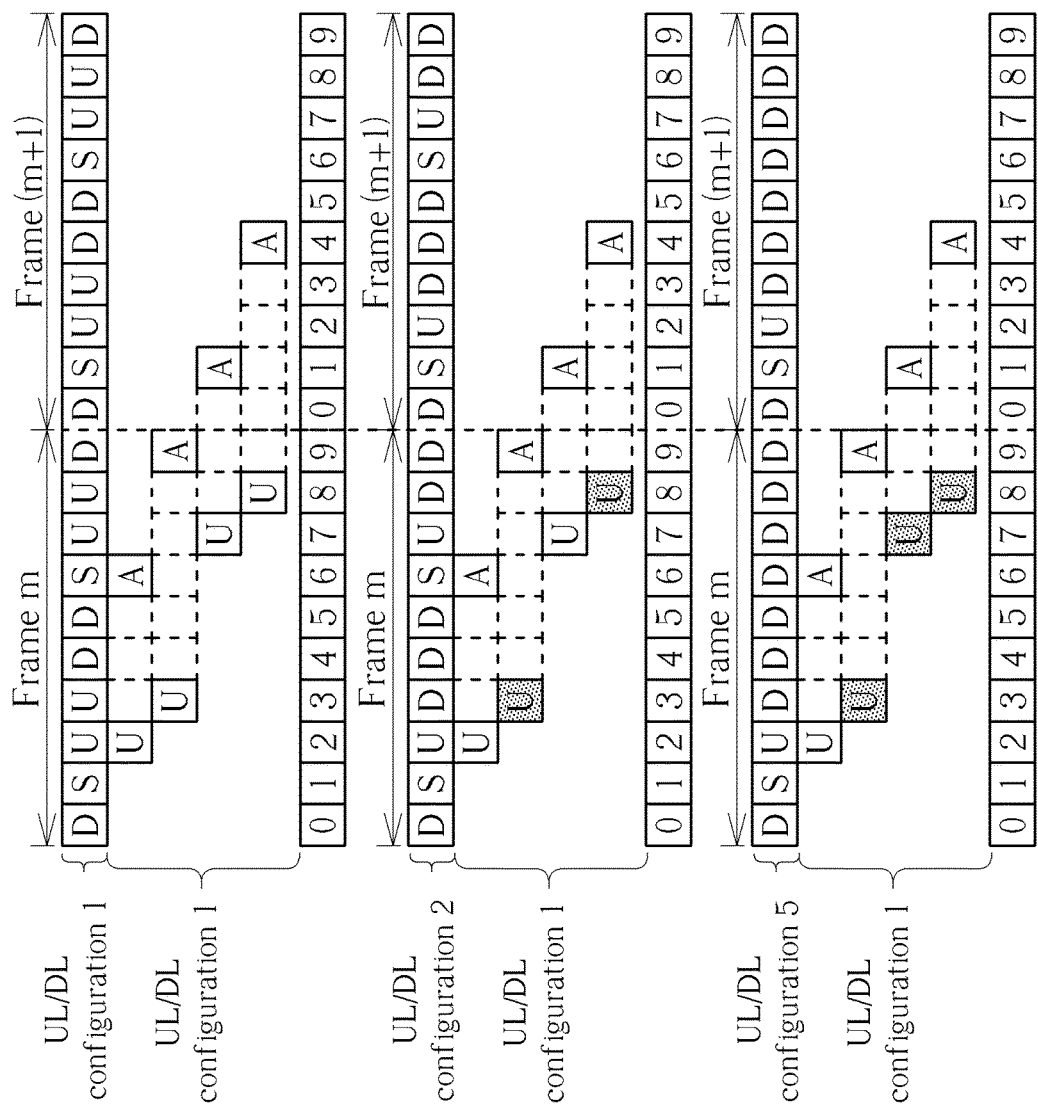
FIG. 9 is a schematic diagram of timelines of UL HARQ feedbacks of UL/DL configurations according to an example of the present invention.

Please refer to FIG. 9, which is a schematic diagram of timelines of UL HARQ feedbacks of UL/DL configurations according to an example of the present invention. As shown in FIG. 9, whether the UL/DL configuration 1, 2 or 5 is scheduled for (or configured to) frames m and (m+1), the network transmits (or intends to transmit) the UL HARQ feedback in a non-conflicting DL subframe of the frame m or the frame (m+1) according to the reference UL/DL configuration which is the UL/DL configuration 1. That is, the timeline of the UL/DL configuration 1 for transmitting the UL HARQ feedback is used for the other UL/DL configurations in the same reconfiguration set. For example, if the UL/DL configuration 2 is scheduled for the frame m, the network may transmit a UL HARQ feedback in the subframe 6 of the frame m to the communication device, wherein the HARQ feedback corresponds to the PUSCH transmission in the subframe 2 of the frame m. Since the subframes 3 and 8 are the DL subframes for the UL/DL configuration 2, no PUSCH transmission happens and no UL HARQ feedback is expected to be transmitted for these subframes. Similarly, since the subframes 3, 7 and 8 are the DL subframes for the UL/DL configuration 5, no PUSCH transmission happens and no UL HARQ feedback is expected to be transmitted for these subframes.

On the other hand, the step of performing the communication operation in the frame with the communication device according to the reference UL/DL configuration, irrespective of the UL/DL configuration scheduled for the frame may include transmitting control information (e.g., DCI) in a DL subframe of the frame, to the communication device according to the reference UL/DL configuration. Note that the DL subframe may be a non-conflicting DL subframe, or a conflicting DL subframe. In this situation, the network may determine the reference UL/DL configuration such that each DL subframe of the reference UL/DL configuration corresponds to a DL subframe of each of the at least one UL/DL configuration with a same subframe index. For example, the DL subframes of the reference UL/DL configuration may be a subset of the DL subframes of each of the at least one UL/DL configuration.

Figure 10:
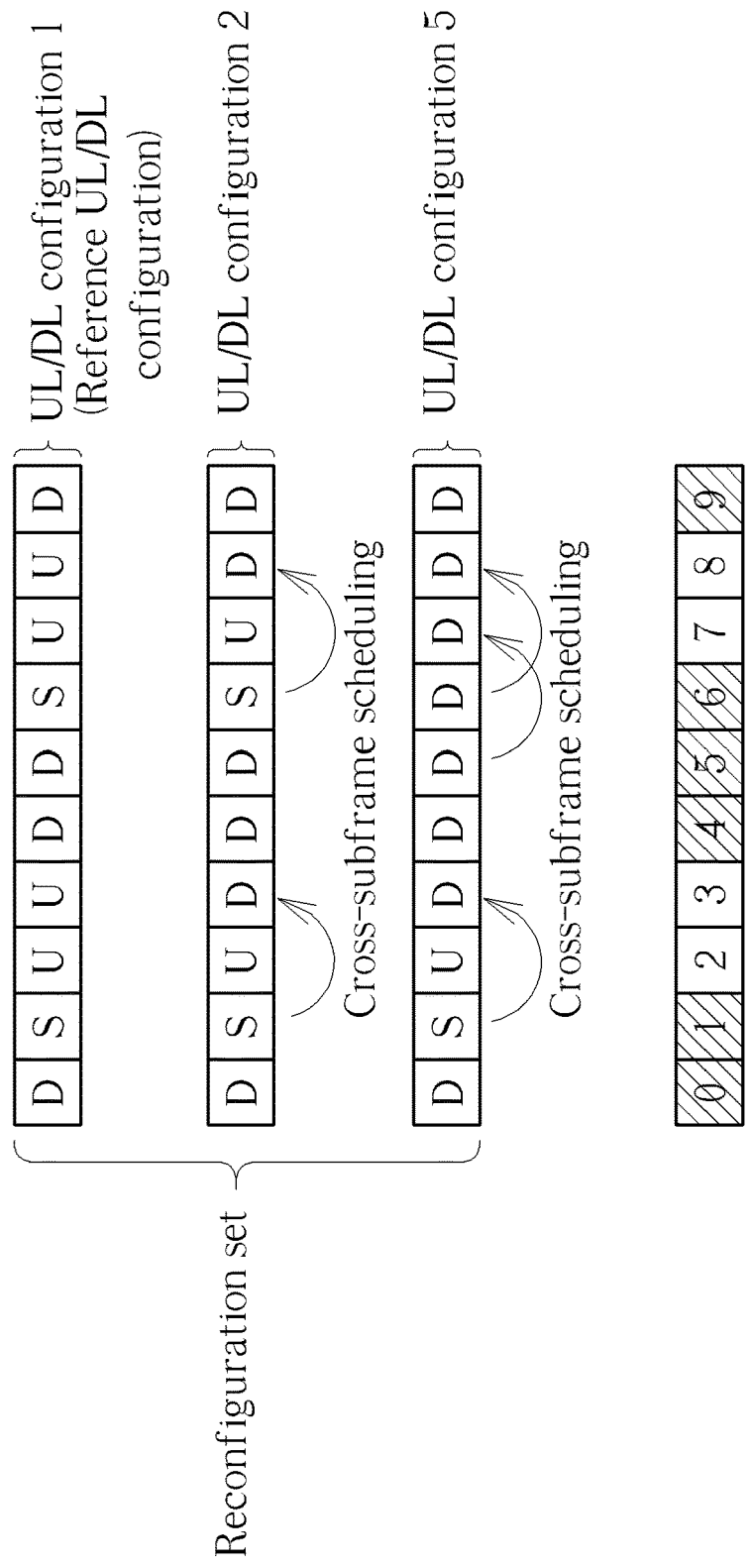
FIG. 10 is a schematic diagram of a reconfiguration set according to an example of the present invention.

Please refer to FIG. 10, which is a schematic diagram of a reconfiguration set according to an example of the present invention. As shown in FIG. 10, the reconfiguration set includes UL/DL configurations 1, 2 and 5. UL subframes and DL subframes are indicated by respective subframe indices. According to the above description, the network determines that the reference UL/DL configuration is the UL/DL configuration 1, because each DL subframe of the UL/DL configuration 1 corresponds to a DL subframe of each of the UL/DL configurations 1, 2 and 5 with a same subframe index. In addition, the network can transmit control information (e.g., DCI) in a DL subframe of the frame to the communication device according to the UL/DL configuration 1, wherein the DL subframe can be the non-conflicting DL subframe such as the subframe 0, 1, 4, 5, 6 or 9. For example, the network may transmit the control information in the subframe 1, to performing a cross-subframe scheduling of the subframe 3.

In another situation, the network may determine the reference UL/DL configuration such that each DL subframe of each of the at least one UL/DL configuration with a same subframe index corresponds to a DL subframe of the reference UL/DL configuration. For example, the DL subframes of the reference UL/DL configuration may be a superset of the DL subframes of each of the at least one UL/DL configuration.

Figure 11:
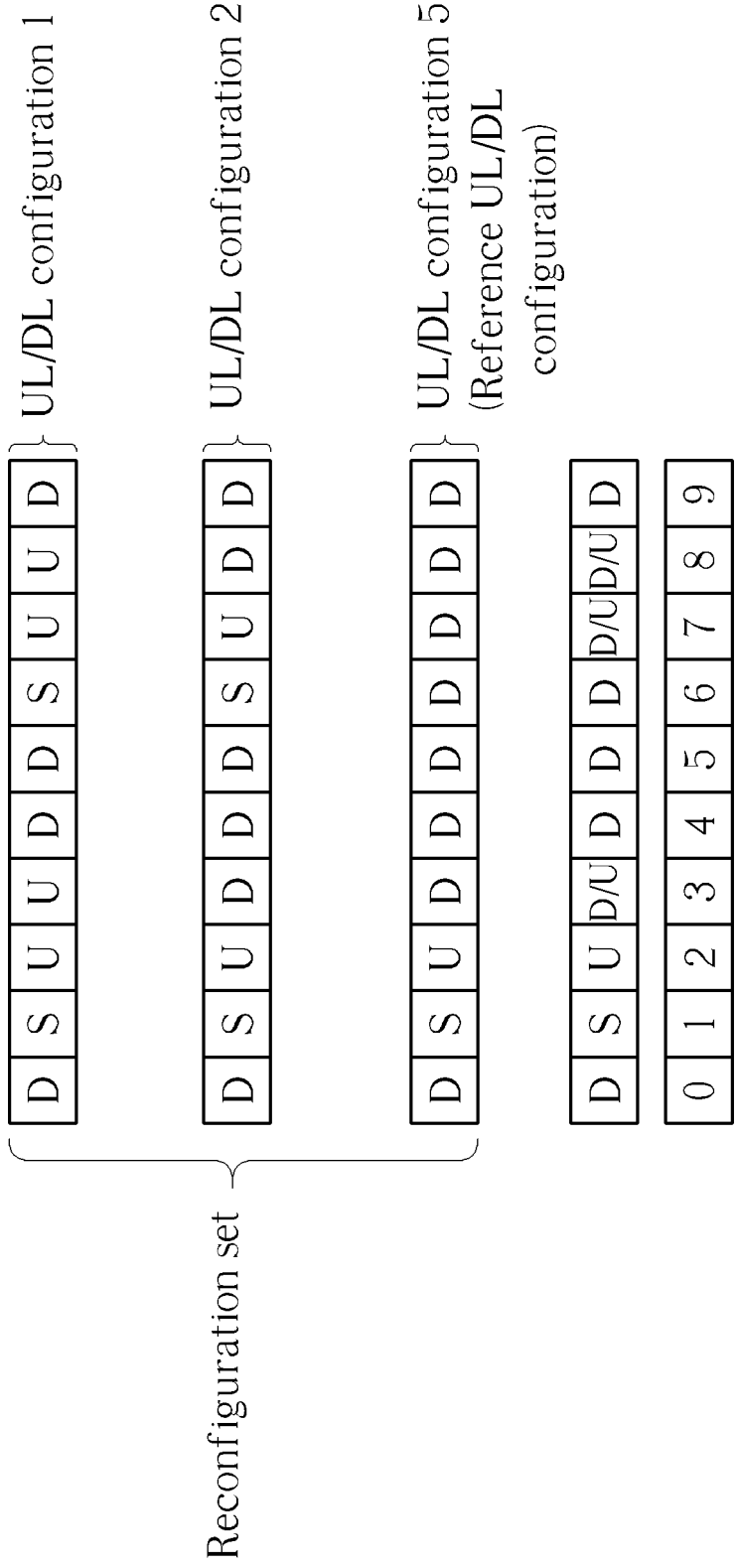
FIG. 11 is a schematic diagram of a reconfiguration set according to an example of the present invention.

Please refer to FIG. 11, which is a schematic diagram of a reconfiguration set according to an example of the present invention. As shown in FIG. 11, the reconfiguration set includes UL/DL configurations 1, 2 and 5. UL subframes and DL subframes are indicated by respective subframe indices. According to the above description, the network determines that the reference UL/DL configuration is the UL/DL configuration 5, because each DL subframe of each of the UL/DL configurations 1, 2 and 5 with a same subframe index corresponds to a DL subframe of the UL/DL configuration 5. In addition, the network can transmit the control information (e.g., DCI) to the communication device, in a DL subframe of the frame, according to the UL/DL configuration 5, wherein the DL subframe can be the non-conflicting DL subframe such as the subframe 0, 1, 4, 5, 6 or 9, and can be the conflicting DL subframe such as the subframe 3, 7 or 8.

Although the UL/DL configurations of the frames m and (m+1) in FIGS. 6, 8 and 9 are the same, this is not a restriction for realizing the present invention. The above descriptions still apply, when the UL/DL configurations of the frames m and (m+1) are different, i.e., the change of the UL/DL configuration occurs at the frame (m+1) (i.e., between the frames m and (m+1)). In addition, the reference UL/DL configurations for different examples do not need to be the same. That is, reference UL/DL configurations for the DL HARQ process, the UL HARQ process and the UL grant should be respectively determined, and the reference UL/DL configurations may not be the same. Furthermore, the present invention does not need to be realized (i.e., enabled) on all the DL HARQ process, the UL HARQ process and the UL grant, but can be realized on any set of the DL HARQ process, the UL HARQ process and the UL grant. For example, the present invention can be only realized on the UL HARQ process.

Figure 12:
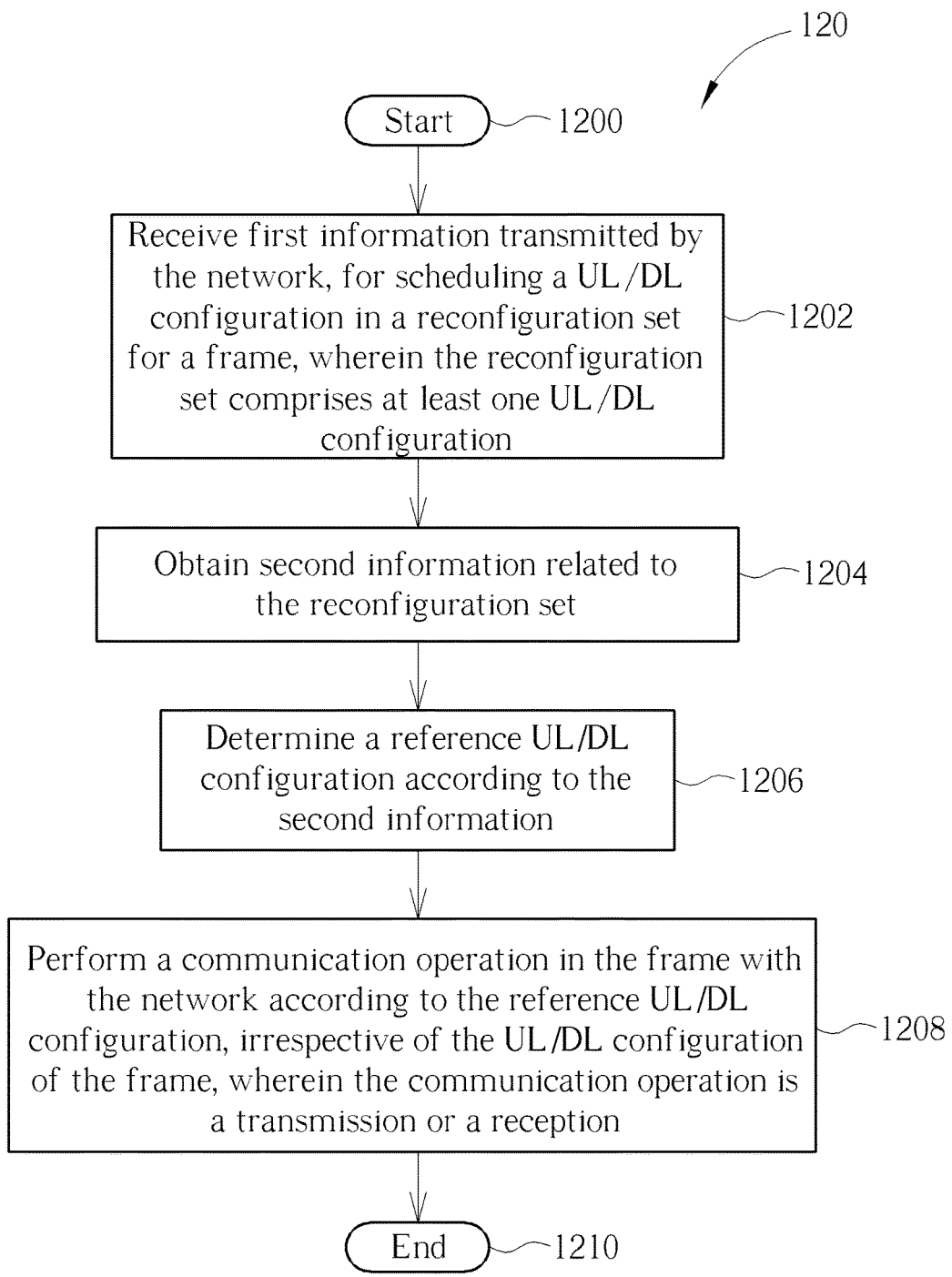
FIG. 12 is a flowchart of a process according to an example of the present invention.

According to the above description, operations of the communication device can be summarized into a process 120 as shown in FIG. 12. The process 120 includes the following steps:

Step 1200: Start.

Step 1202: Receive first information transmitted by the network, for scheduling a UL/DL configuration in a reconfiguration set for a frame, wherein the reconfiguration set comprises at least one UL/DL configuration.

Step 1204: Obtain second information related to the reconfiguration set.

Step 1206: Determine a reference UL/DL configuration according to the second information.

Step 1208: Perform a communication operation in the frame with the network according to the reference UL/DL configuration, irrespective of the UL/DL configuration scheduled for the frame, wherein the communication operation is a transmission or a reception.

Step 1210: End.

Operations and variations of the process 120 can be referred to the above description, and examples are described from the viewpoint of the communication device in the following paragraphs.

For example, the second information may include the reference UL/DL configuration, and the communication device can perform the communication operation according to the reference UL/DL configuration directly. In another example, the second information may include the reconfiguration set. The communication device needs to determine the reference UL/DL configuration according to the reconfiguration set first, and then performs the communication operation according to the reference UL/DL configuration. In addition, the communication device may obtain the second information by receiving the second information transmitted by the network. In another example, the communication device may obtain the second information according to a predetermined rule.

In addition, a time period during which the process 120 is realized is not limited. For example, the communication device may perform the communication operation with the network according to the reference UL/DL configuration, irrespective of the UL/DL configuration of the frame, within at least one frame after the frame. That is, the reference UL/DL configuration is used during first few frames following the frame. In another example, the communication device may perform the communication operation with the network according to the reference UL/DL configuration, irrespective of the UL/DL configuration of the frame, after receiving the second information. That is, the reference UL/DL configuration is determined and used for all frames, after receiving the second information.

In another example, the communication device performs the communication operation in the frame with the network according to the reference UL/DL configuration, irrespective of the UL/DL configuration of the frame, when the communication device experiences a change of the UL/DL configuration due to the communication device moving across at least one cell of the network. That is, the at least one cell may simply have different UL/DL configurations which may be fixed, semi-static or dynamically changed. The communication device experiences the change of the UL/DL configuration because moving across the at least one cell with various UL/DL configurations.

On the other hand, the step of performing the communication operation in the frame with the network according to the reference UL/DL configuration, irrespective of the UL/DL configuration scheduled for the frame may include transmitting a DL HARQ feedback corresponding to (i.e., in response to) at least one PDSCH reception, in a non-conflicting UL subframe of the frame, to the network according to the reference UL/DL configuration. Note that the non-conflicting UL subframe means that it is UL for all the at least one UL/DL configuration in the reconfiguration set. In this situation, the communication device may determine the reference UL/DL configuration such that each DL subframe of each of the at least one UL/DL configuration with a same subframe index corresponds to a DL subframe of the reference UL/DL configuration, e.g., if the second information does not include the reference UL/DL configuration. For example, the DL subframes of the reference UL/DL configuration may be a superset of the DL subframes of each of the at least one UL/DL configuration. Detailed description regarding the present example can be referred to the descriptions of FIGS. 5 and 6, and is not narrated herein. For example, the descriptions can be easily applied to the present example by interchanging the communication device and the network, and by interchanging transmitting and receiving, etc.

On the other hand, the step of performing the communication operation in the frame with the network according to the reference UL/DL configuration, irrespective of the UL/DL configuration scheduled for the frame may include receiving a UL grant in a first non-conflicting DL subframe of the frame according to the reference UL/DL configuration, wherein the UL grant is transmitted by the network, or may include receiving a UL HARQ feedback corresponding to at least one PUSCH reception, in a second non-conflicting DL subframe of the frame, according to the reference UL/DL configuration, wherein the UL HARQ feedback is transmitted by the network. In this situation, the communication device may determine the reference UL/DL configuration such that each UL subframe of each of the at least one UL/DL configuration with a same subframe index corresponds to a UL subframe of the reference UL/DL configuration, e.g., if the second information does not include the reference UL/DL configuration. For example, the UL subframes of the reference UL/DL configuration may be a superset of the UL subframes of each of the at least one UL/DL configuration. Detailed description regarding the present example can be referred to the descriptions of FIGS. 7-9, and is not narrated herein. For example, the descriptions can be easily applied to the present example by interchanging the communication device and the network, and by interchanging transmitting and receiving, etc.

On the other hand, the step of performing the communication operation in the frame with the network according to the reference UL/DL configuration, irrespective of the UL/DL configuration scheduled for the frame may include receiving control information (e.g., DCI) transmitted by the network, in a DL subframe of the frame, according to the reference UL/DL configuration. Note that the DL subframe may be a non-conflicting DL subframe. In this situation, the communication device may determine the reference UL/DL configuration such that each DL subframe of the reference UL/DL configuration corresponds to a DL subframe of each of the at least one UL/DL configuration with a same subframe index, e.g., when cross-subframe scheduling is supported. The present example may be realized, if the second information does not include the reference UL/DL configuration. For example, the DL subframes of the reference UL/DL configuration may be a subset of the DL subframes of each of the at least one UL/DL configuration. Detailed description regarding the present example can be referred to the description of FIG. 10, and is thus not narrated herein. For example, the description can be easily applied to the present example by interchanging the communication device and the network, and by interchanging transmitting and receiving, etc.

In another situation, the communication device may determine the reference UL/DL configuration such that each DL subframe of each of the at least one UL/DL configuration with a same subframe index corresponds to a DL subframe of the reference UL/DL configuration, e.g., when cross-subframe scheduling is not supported. The present example may be realized, if the second information does not include the reference UL/DL configuration. For example, the DL subframes of the reference UL/DL configuration may be a superset of the DL subframes of each of the at least one UL/DL configuration. Detailed description regarding the present example can be referred to the description of FIG. 11, and is not narrated herein. For example, the description can be easily applied to the present example by interchanging the communication device and the network, and by interchanging transmitting and receiving, etc.

Figure 13:
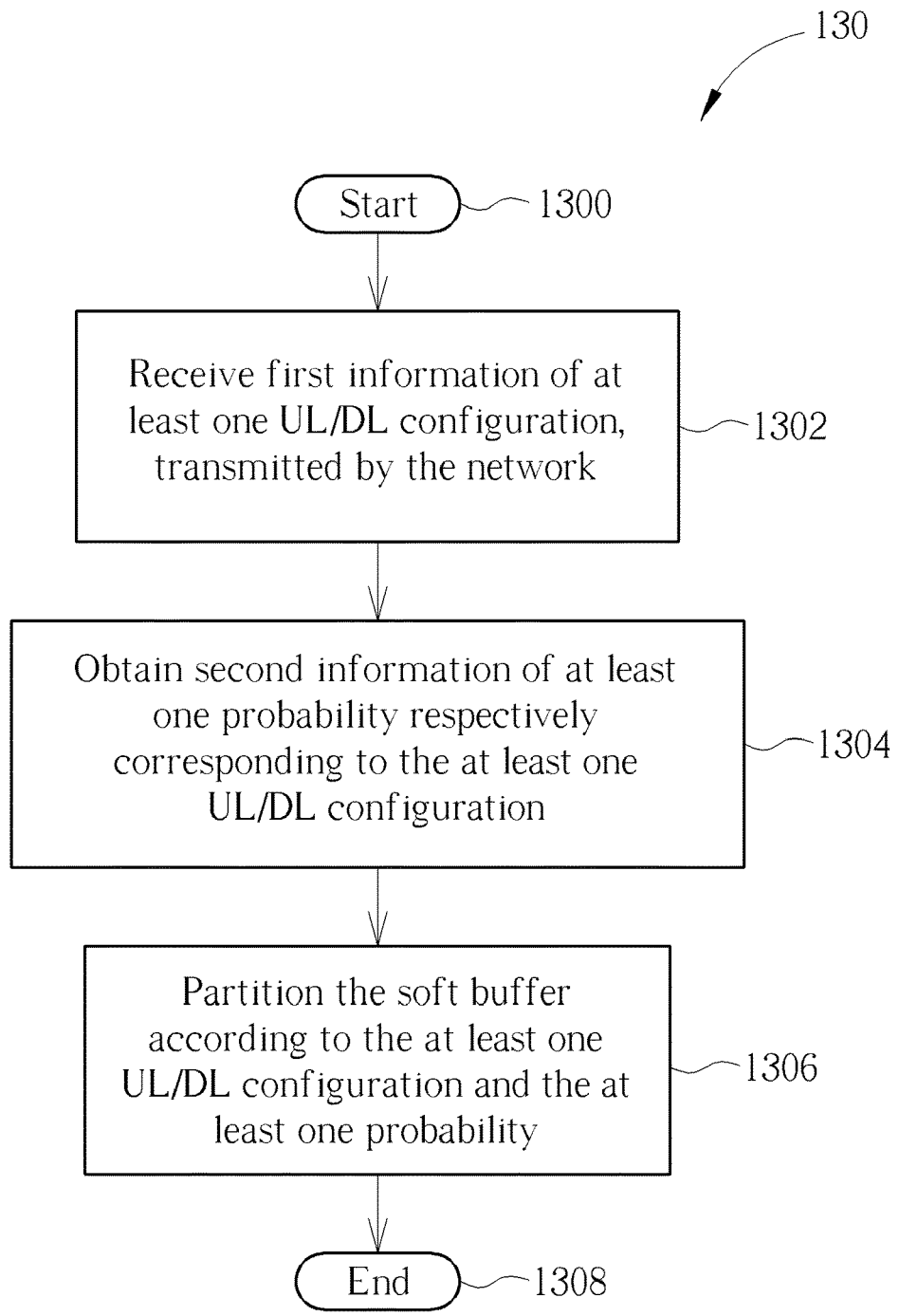
FIG. 13 is a flowchart of a process according to an example of the present invention.

Please refer to FIG. 13, which is a flowchart of a process 130 according to an example of the present invention. The process 130 is utilized in the communication device shown in FIG. 2, for handling (e.g., partitioning) a soft buffer of the communication device. The process 130 may be compiled into the program code 314 and includes the following steps:

Step 1300: Start.

Step 1302: Receive first information of at least one UL/DL configuration, transmitted by the network.

Step 1304: Obtain second information of at least one probability respectively corresponding to the at least one UL/DL configuration.

Step 1306: Partition the soft buffer according to the at least one UL/DL configuration and the at least one probability.

Step 1308: End.

According to the process 130, the communication device receives first information of at least one UL/DL configuration, transmitted by the network, and obtains second information of at least one probability respectively corresponding to the at least one UL/DL configuration. That is, each UL/DL configuration corresponds to a probability. In addition, the first information may be an indicator (e.g., indicating one or more elements in a table), at least one value of the at least probability, etc, and is not limited. Then, the communication device can partition the soft buffer according to the at least one UL/DL configuration and the at least one probability. In other words, the communication device does not partition the soft buffer according a UL/DL configuration configured to (i.e., scheduled for) the communication device, but partitions the soft buffer according to the at least one UL/DL configuration and the at least one probability. Thus, the problem that the communication device repartitions the soft buffer frequently according to the change of the UL/DL configuration is solved. Soft values of the HARQ feedback can be stored in the soft buffer properly without being overwritten or being dropped due to insufficient number of partitions. As a result, performance (e.g., throughput) of the communication device is improved.

Realization of the process 130 is not limited to the above description. For example, the at least one UL/DL configuration is a subset of a reconfiguration set. That is, the reconfiguration set may include one or more UL/DL configurations, and the network transmits the subset of the UL/DL configurations to the communication device. In another example, the at least one probability can be determined according to a traffic load, the at least one UL/DL configuration, and/or a number of the at least one UL/DL configuration. That is, each probability can be determined to a combination of the abovementioned factors. In addition, the communication device may obtain the second information by receiving the second information transmitted by the network, or the communication device may obtain the second information according to a predetermined rule. For example, the predetermined rule may be that the at least one probability is the same, i.e., equally probable.

On the other hand, the communication device can perform the following two steps to partition the soft buffer according to the at least one UL/DL configuration and the at least one probability. First, the communication device determines an equivalent maximum number of DL HARQ processes according to the at least one probability and at least one maximum number of DL HARQ processes respectively corresponding to the at least one UL/DL configuration. Then, the communication device partitions the soft buffer according to the equivalent maximum number of DL HARQ processes.

For example, when partitioning the soft buffer according to the equivalent maximum number of DL HARQ processes, the communication device can partition the soft buffer according to the following equation:

$$N_{IR} = \left\lfloor \frac{N_{soft}}{K_C \cdot K_{MIMO} \cdot \min(M^*_{DL\_HARQ}, M_{limit})} \right\rfloor; \quad (\text{Eq. 1})$$

wherein $N_{IR}$ is a size of a partition for storing a transport block; $N_{soft}$ is a total number of soft channel bits of the communication device; $K_{MIMO}$ is a maximum number of transport blocks transmitted to the communication device in a transmission time interval (TTI); $K_C$ is a positive number depends on $N_{soft}$; $M_{limit}$ is a positive value; min(x,y) returns the smaller one of x and y; and $\lfloor x \rfloor$ returns the largest integer not greater than x, and $M^*_{DL\_HARQ}$ is the equivalent maximum number of DL HARQ processes.

In another example, when determining the equivalent maximum number of DL HARQ processes according to the at least one probability and the at least one maximum number of DL HARQ processes respectively corresponding to the at least one UL/DL configuration, the communication device can determine the equivalent maximum number of DL HARQ processes according to the following equation:

$$M^*_{DL\_HARQ} = \left\lceil \sum_{i=1}^{N_{Config}} p(i) \cdot M^{(i)}_{DL\_HARQ} \right\rceil; \quad (\text{Eq. 2})$$

wherein $M^*_{DL\_HARQ}$ is the equivalent maximum number of DL HARQ processes; p(i) is a probability of the ith UL/DL configuration of the at least on UL/DL configuration; $M_{DL\_HARQ}^{(i)}$ is the at least one maximum number of DL HARQ processes of the ith UL/DL configuration of the at least on UL/DL configuration; and $N_{Config}$ is a number of the at least one UL/DL configuration. For example, if the at least one UL/DL configuration includes UL/DL configurations 0, 1 and 2, $N_{Config}=3$ can be obtained. Further, the UL/DL configurations 0, 1 and 2 correspond to $M_{DL\_HARQ}^{(1)}$, $M_{DL\_HARQ}^{(2)}$ and $M_{DL\_HARQ}^{(3)}$, respectively, and correspond to p(1), p(2) and p(3), respectively. Assuming $M_{DL\_HARQ}^{(1)}=4$, $M_{DL\_HARQ}^{(2)}=7$, $M_{DL\_HARQ}^{(3)}=10$, p(1)=0.5, p(2)=0.2 and p(3)=0.3, $M^*_{DL\_HARQ}=6$ can be obtained. Then, $$N_{IR} = \left\lfloor \frac{N_{soft}}{K_C \cdot K_{MIMO} \cdot \min(6, M_{limit})} \right\rfloor$$

can be obtained, after system parameters such as $K_C$, $K_{MIMO}$, $N_{soft}$ and $M_{limit}$ are specified.

In another example, when determining the equivalent maximum number of DL HARQ processes according to the at least one probability and the at least one maximum number of DL HARQ processes respectively corresponding to the at least one UL/DL configuration, the communication device can determine the equivalent maximum number of DL HARQ processes according to the following equation:

$$l = \arg_{i=1,\ldots,N_{Config}} \max\{p(i)\}, \quad (\text{Eq. 3})$$

$$M^*_{DL\_HARQ} = M^{(l)}_{DL\_HARQ};$$

wherein $M^*_{DL\_HARQ}$ is the equivalent maximum number of DL HARQ processes; p(i) is a probability of the ith UL/DL configuration of the at least on UL/DL configuration; l is the index of the UL/DL configuration with the maximum probability, $M_{DL\_HARQ}^{(l)}$ is the equivalent maximum number of DL HARQ processes of a UL/DL configuration of the at least on UL/DL configuration with the maximum probability; and $N_{Config}$ a number of the at least one UL/DL configuration. Reusing the parameters assumed in the previous example, i.e., $M_{DL\_HARQ}^{(1)}=4$, $M_{DL\_HARQ}^{(2)}=7$, $M_{DL\_HARQ}^{(3)}=10$, p(1)=0.5, p(2)=0.2 and p(3)=0.3, $M^*_{DL\_HARQ}=6$, l=1 and $M^*_{DL\_HARQ}=4$ can be obtained. Then, $$N_{IR} = \left\lfloor \frac{N_{soft}}{K_C \cdot K_{MIMO} \cdot \min(4, M_{limit})} \right\rfloor$$

can be obtained, after system parameters such as $K_C$, $K_{MIMO}$, $N_{soft}$ and $M_{limit}$ are specified.

Figure 14:
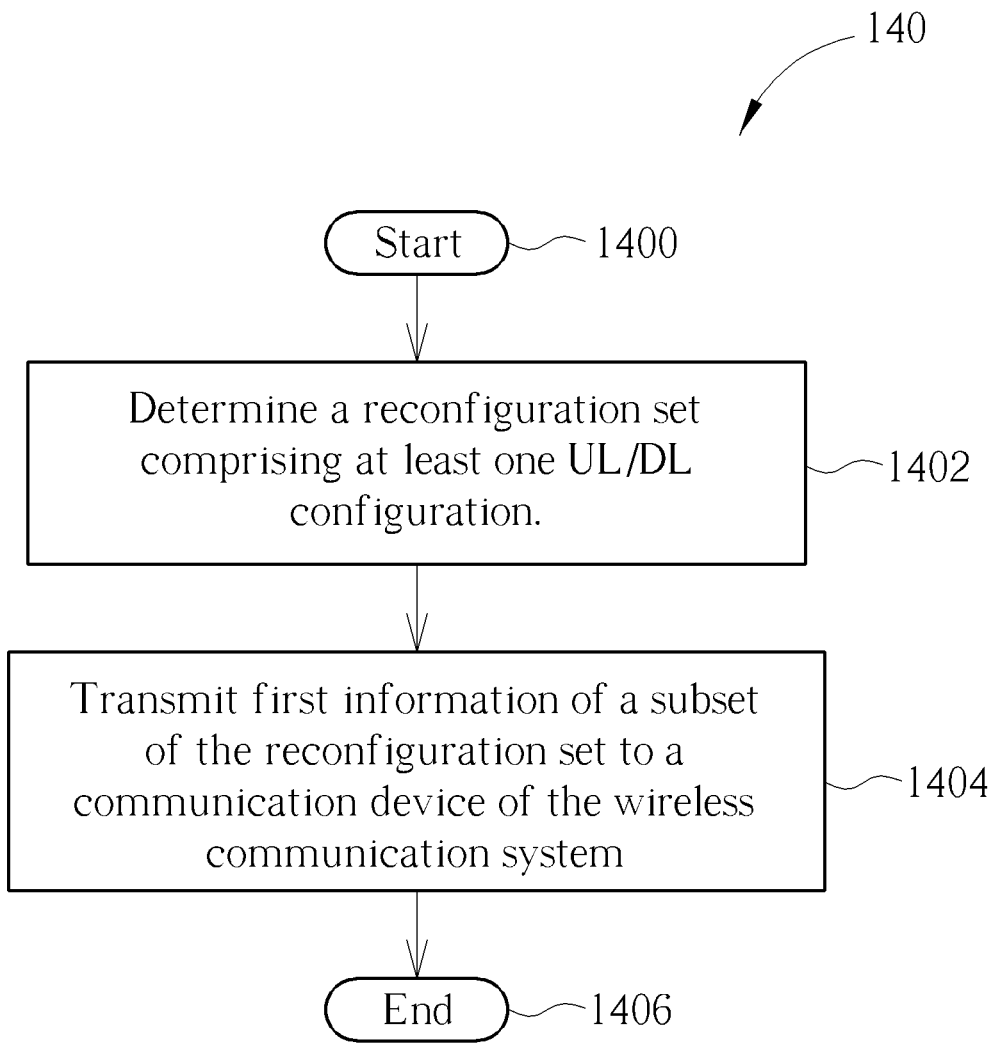
FIG. 14 is a flowchart of a process according to an example of the present invention.

According to the above description, operations of the network can be summarized into a process 140 as shown in FIG. 14. The process 140 includes the following steps:

Step 1400: Start.

Step 1402: Determine a reconfiguration set comprising at least one UL/DL configuration.

Step 1404: Transmit first information of a subset of the reconfiguration set to a communication device of the wireless communication system.

Step 1406: End.

Operations and variations of the process 140 can be referred to the above description, and are not narrated herein. According to the process 140, the communication device can partition the soft buffer according to the at least one UL/DL configuration, after receiving the first information.

As mentioned previously, the network may further determine at least one probability respectively corresponding to the at least one UL/DL configuration, and transmit second information of the at least one probability to the communication device. Thus, the communication device can partition the soft buffer according to the at least one UL/DL configuration and the at least one probability. In addition, the step of determining the at least one probability for the at least one UL/DL configuration may include determining the at least one probability according to a traffic load, the at least one UL/DL configuration, and/or a number of the at least one UL/DL configuration.

Those skilled in the art can readily make combinations, modifications and/or alterations on the abovementioned description and examples according to their needs. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

The present invention provides a method for handling a method of handling a communication operation in a TDD system. The problems of missing detecting, false alarm and partitioning of the soft buffer are solved. As a result, performance (e.g., throughput) of the communication device is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for handling a communication operation in a wireless communication system, comprising:
a storage device; and
a processing circuit, coupled to the storage device, wherein the storage device stores, and the processing circuit is configures to execute instruction of:
determining a reconfiguration set comprising a first plurality of uplink (UL)/downlink (DL) configurations;
scheduling a second plurality of UL/DL configurations in the reconfiguration set for a plurality of frames;
selecting a UL/DL configuration from the first plurality of UL/DL configurations as a reference UL/DL configuration;
transmitting information related to the reconfiguration set to a communication device of the wireless communication system; and
performing a plurality of communication operations in the plurality of frames with the communication device according to the reference UL/DL configuration but not according to the second plurality of UL/DL configurations scheduled for the plurality of frames, wherein the plurality of communication operations comprise a set of a plurality of transmissions and a plurality of receptions;
wherein each DL subframe of each of the first plurality of UL/DL configurations in the reconfiguration set with a same subframe index corresponds to a DL subframe of the reference UL/DL configuration.

2. The network of claim 1, wherein the information comprises the reference UL/DL configuration and/or the reconfiguration set.

3. The network of claim 1, wherein the network performs the plurality of communication operations with the communication device according to the reference UL/DL configuration but not according to the second plurality of UL/DL configurations of the plurality of frames, within at least one frame after the plurality of frames.

4. The network of claim 1, wherein the network performs the plurality of communication operations with the communication device according to the reference UL/DL configuration but not according to the second plurality of UL/DL configurations of the plurality of frames, after the reconfiguration set is determined.

5. The network of claim 1, wherein the step of performing the plurality of communication operations in the plurality of frames with the communication device according to the reference UL/DL configuration but not according to the second plurality of UL/DL configurations scheduled for the plurality of frames comprises:
receiving a DL hybrid automatic repeat request (HARQ) feedback corresponding to at least one physical DL shared channel (PDSCH) transmission, in a UL subframe of one of the plurality of frames, according to the reference UL/DL configuration, wherein the DL HARQ feedback is transmitted by the communication device.

6. The network of claim 1, wherein the step of performing the plurality of communication operations in the plurality of frames with the communication device according to the reference UL/DL configuration but not according to the second plurality of UL/DL configurations scheduled for the plurality of frames comprises:
transmitting control information in a DL subframe of one of the plurality of frames, to the communication device according to the reference UL/DL configuration.

7. The network of claim 6, wherein each DL subframe of the reference UL/DL configuration corresponds to a DL subframe of each of the first plurality of UL/DL configurations in the reconfiguration set with a same subframe index.

8. The network of claim 6, wherein each DL subframe of each of the first plurality of UL/DL configurations in the reconfiguration set with a same subframe index corresponds to a DL subframe of the reference UL/DL configuration.

9. A communication device for handling a communication operation in a wireless communication system, comprising:
a storage device; and
a processing circuit, coupled to the storage device, wherein the storage device stores, and the processing circuit is configures to execute instruction of:
receiving first information transmitted by a network of the wireless communication system, for scheduling a second plurality of uplink (UL)/downlink (DL) configurations in a reconfiguration set for a plurality of frames, wherein the reconfiguration set comprises a first plurality of UL/DL configurations;

obtaining second information related to the reconfiguration set;

selecting a UL/DL configuration from the second information as a reference UL/DL configuration; and performing a plurality of communication operations in the plurality of frames with the network according to the reference UL/DL configuration but not according to the second plurality of UL/DL configurations scheduled for the plurality of frames in the reconfiguration set, wherein the plurality of communication operations comprise a set of a plurality of transmissions and a plurality of receptions;

wherein each DL subframe of each of the first plurality of UL/DL configurations in the reconfiguration set with a same subframe index corresponds to a DL subframe of the reference UL/DL configuration.

10. The communication device of claim 9, wherein the second information comprises the reference UL/DL configuration and/or the reconfiguration set.

11. The communication device of claim 9, wherein the communication device obtains the second information by receiving the second information transmitted by the network, or according to a predetermined rule.

12. The communication device of claim 9, wherein the communication device performs the plurality of communication operations with the network according to the reference UL/DL configuration but not according to the second plurality of UL/DL configurations of the plurality of frames, within at least one frame after the plurality of frames.

13. The communication device of claim 9, wherein the communication device performs the plurality of communication operations with the communication device according to the reference UL/DL configuration but not according to the second plurality of UL/DL configurations of the plurality of frames, after receiving the second information.

14. The communication device of claim 9, wherein the communication device performs the plurality of communication operations in the plurality of frames with the network according to the reference UL/DL configuration but not according to the second plurality of UL/DL configurations of the plurality of frames, when the communication device experiences a change of the second plurality of UL/DL configurations due to that the communication device moves across at least one cell of the network.

15. The communication device of claim 9, wherein the step of performing the plurality of communication operations in the plurality of frames with the network according to the reference UL/DL configuration but not according to the second plurality of UL/DL configurations scheduled for the plurality of frames comprises:

transmitting a DL hybrid automatic repeat request (HARD) feedback corresponding to at least one physical DL shared channel (PDSCH) reception, in a UL subframe of one of the plurality of frames, to the network according to the reference UL/DL configuration.

16. The communication device of claim 9, wherein the step of performing the plurality of communication operations in the plurality of frames with the network according to the reference UL/DL configuration but not according to the second plurality of UL/DL configurations scheduled for the plurality of frames comprises:

receiving control information transmitted by the network, in a DL subframe of one of the plurality of frames, according to the reference UL/DL configuration.

17. The communication device of claim 16, wherein each DL subframe of the reference UL/DL configuration corresponds to a DL subframe of each of the first plurality of UL/DL configurations in the reconfiguration set with a same subframe index.

18. The communication device of claim 16, wherein each DL subframe of each of the first plurality of UL/DL configurations in the reconfiguration set with a same subframe index corresponds to a DL subframe of the reference UL/DL configuration.

19. The network of claim 5, wherein the UL subframe is a non-conflicting UL subframe for all the first plurality of UL/DL configurations in the reconfiguration set.

20. The communication device of claim 15, wherein the UL subframe is a non-conflicting UL subframe for all the first plurality of UL/DL configurations in the reconfiguration set.

21. A network for handling a communication operation in a wireless communication system, comprising:

a storage device; and a processing circuit, coupled to the storage device, wherein the storage device stores, and the processing circuit is configures to execute instruction of:

determining a reconfiguration set comprising a first plurality of uplink (UL)/downlink (DL) configurations;

scheduling a second plurality of UL/DL configurations in the reconfiguration set for a plurality of frames;

selecting a UL/DL configuration from the first plurality of UL/DL configurations as a reference UL/DL configuration;

transmitting information related to the reconfiguration set to a communication device of the wireless communication system; and performing a plurality of communication operations in the plurality of frames with the communication device according to the reference UL/DL configuration but not according to the second plurality of UL/DL configurations scheduled for the plurality of frames, wherein the plurality of communication operations comprise a set of a plurality of transmissions and a plurality of receptions;

wherein each UL subframe of each of the first plurality of UL/DL configurations in the reconfiguration set with a same subframe index corresponds to a UL subframe of the reference UL/DL configuration.

22. The network of claim 21, wherein the information comprises the reference UL/DL configuration and/or the reconfiguration set.

23. The network of claim 21, wherein the network performs the plurality of communication operations with the communication device according to the reference UL/DL configuration but not according to the second plurality of UL/DL configurations of the plurality of frames, within at least one frame after the plurality of frames.

24. The network of claim 21, wherein the network performs the plurality of communication operations with the communication device according to the reference UL/DL configuration but not according to the second plurality of UL/DL configurations of the plurality of frames, after the reconfiguration set is determined.

25. The network of claim 21, wherein the step of performing the plurality of communication operations in the plurality of frames with the communication device according to the reference UL/DL configuration but not according to the second plurality of UL/DL configurations scheduled for the plurality of frames comprises:
   transmitting a UL grant in a first DL subframe of one of the plurality of frames to the communication device according to the reference UL/DL configuration; or
   transmitting a UL HARQ feedback corresponding to at least one physical UL shared channel (PUSCH) reception, in a second DL subframe of one of the plurality of frames, to the communication device according to the reference UL/DL configuration.

26. The network of claim 25, wherein the first DL subframe and the second DL subframe are non-conflicting DL subframes for all the first plurality of UL/DL configurations in the reconfiguration set.

27. The network of claim 21, wherein the step of performing the plurality of communication operations in the plurality of frames with the communication device according to the reference UL/DL configuration but not according to the second plurality of UL/DL configurations scheduled for the plurality of frames comprises:
   transmitting control information in a DL subframe of one of the plurality of frames, to the communication device according to the reference UL/DL configuration.

28. The network of claim 27, wherein each DL subframe of the reference UL/DL configuration corresponds to a DL subframe of each of the first plurality of UL/DL configurations in the reconfiguration set with a same subframe index.

29. The network of claim 27, wherein each DL subframe of each of the first plurality of UL/DL configurations in the reconfiguration set with a same subframe index corresponds to a DL subframe of the reference UL/DL configuration.

30. A communication device for handling a communication operation in a wireless communication system, comprising:
   a storage device; and
   a processing circuit, coupled to the storage device, wherein the storage device stores, and the processing circuit is configures to execute instruction of:
   receiving first information transmitted by a network of the wireless communication system, for scheduling a second plurality of uplink (UL)/downlink (DL) configurations in a reconfiguration set for a plurality of frames, wherein the reconfiguration set comprises a first plurality of UL/DL configurations;
   obtaining second information related to the reconfiguration set;
   selecting a UL/DL configuration from the second information as a reference UL/DL configuration; and
   performing a plurality of communication operations in the plurality of frames with the network according to the reference UL/DL configuration but not according to the second plurality of UL/DL configurations scheduled for the plurality of frames in the reconfiguration set, wherein the plurality of communication operations comprise a set of a plurality of transmissions and a plurality of receptions;
   wherein each UL subframe of each of the first plurality of UL/DL configurations in the reconfiguration set with a same subframe index corresponds to a UL subframe of the reference UL/DL configuration.

31. The communication device of claim 30, wherein the second information comprises the reference UL/DL configuration and/or the reconfiguration set.

32. The communication device of claim 30, wherein the communication device obtains the second information by receiving the second information transmitted by the network, or according to a predetermined rule.

33. The communication device of claim 30, wherein the communication device performs the plurality of communication operations with the network according to the reference UL/DL configuration but not according to the second plurality of UL/DL configurations of the plurality of frames, within at least one frame after the plurality of frames.

34. The communication device of claim 30, wherein the communication device performs the plurality of communication operations with the communication device according to the reference UL/DL configuration but not according to the second plurality of UL/DL configurations of the plurality of frames, after receiving the second information.

35. The communication device of claim 30, wherein the communication device performs the plurality of communication operations in the plurality of frames with the network according to the reference UL/DL configuration but not according to the second plurality of UL/DL configurations of the plurality of frames, when the communication device experiences a change of the second plurality of UL/DL configurations due to that the communication device moves across at least one cell of the network.

36. The communication device of claim 30, wherein the step of performing the plurality of communication operations in the plurality of frames with the network according to the reference UL/DL configuration but not according to the second plurality of UL/DL configurations scheduled for the plurality of frames comprises:
   receiving a UL grant in a first DL subframe of one of the plurality of frames according to the reference UL/DL configuration, wherein the UL grant is transmitted by the network; or
   receiving a UL HARQ feedback corresponding to at least one physical UL shared channel (PUSCH) transmission, in a second DL subframe of one of the plurality of frames, according to the reference UL/DL configuration, wherein the UL HARQ feedback is transmitted by the network.

37. The communication device of claim 36, wherein the first DL subframe and the second DL subframe are non-conflicting DL subframes for all the first plurality of UL/DL configurations in the reconfiguration set.

38. The communication device of claim 30, wherein the step of performing the plurality of communication operations in the plurality of frames with the network according to the reference UL/DL configuration but not according to the second plurality of UL/DL configurations scheduled for the plurality of frames comprises:
   receiving control information transmitted by the network, in a DL subframe of one of the plurality of frames, according to the reference UL/DL configuration.

39. The communication device of claim 38, wherein each DL subframe of the reference UL/DL configuration corresponds to a DL subframe of each of the first plurality of UL/DL configurations in the reconfiguration set with a same subframe index.

40. The communication device of claim 38, wherein each DL subframe of each of the first plurality of UL/DL configurations in the reconfiguration set with a same subframe index corresponds to a DL subframe of the reference UL/DL configuration.

* * * * *